Jan. 24, 1956  S. KASS  2,732,091
ADJUSTABLE FLOWER BOX
Filed Nov. 12, 1954  2 Sheets-Sheet 2
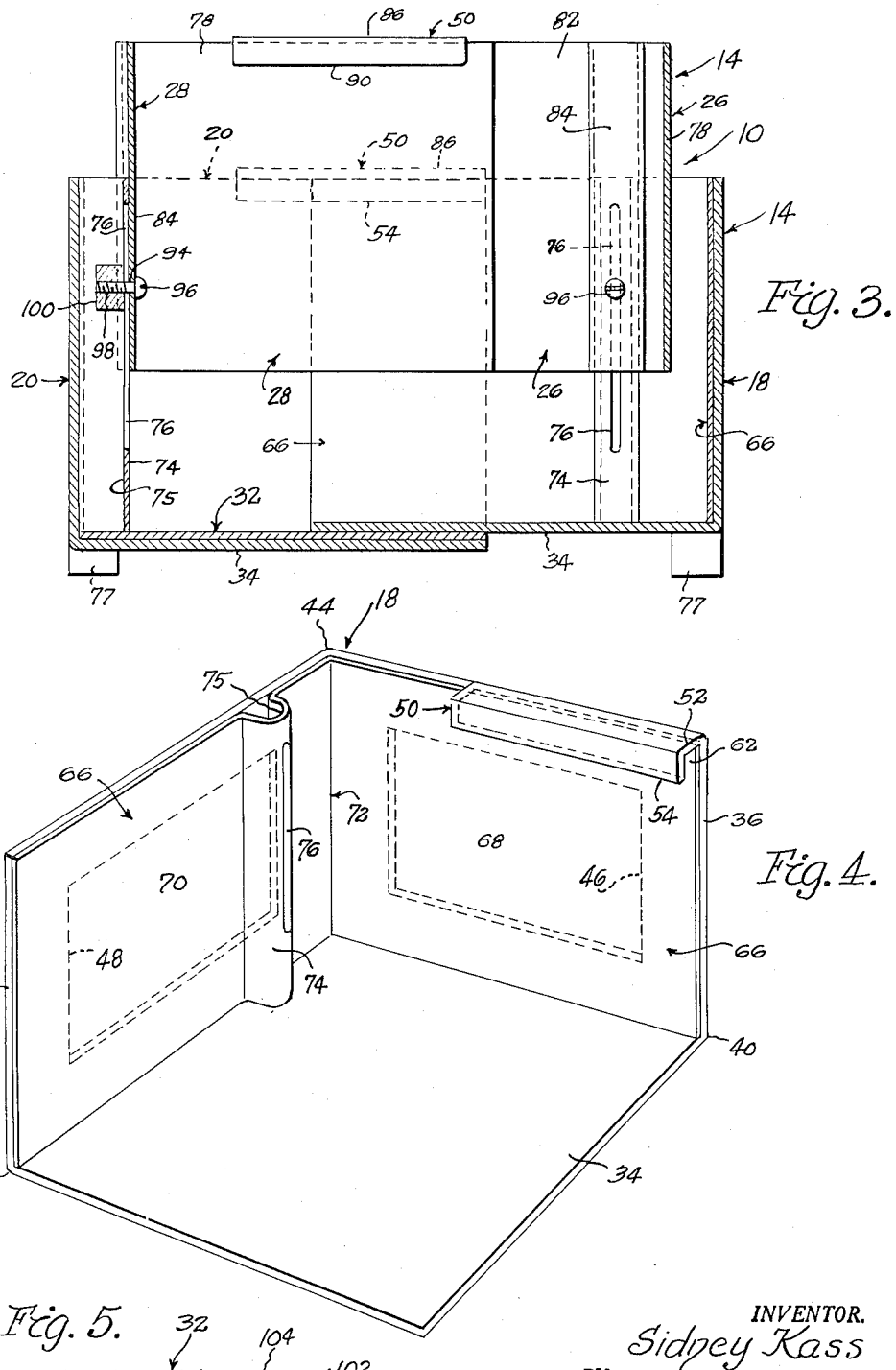
INVENTOR.
Sidney Kass
BY Barthel + Bugbee
Attys

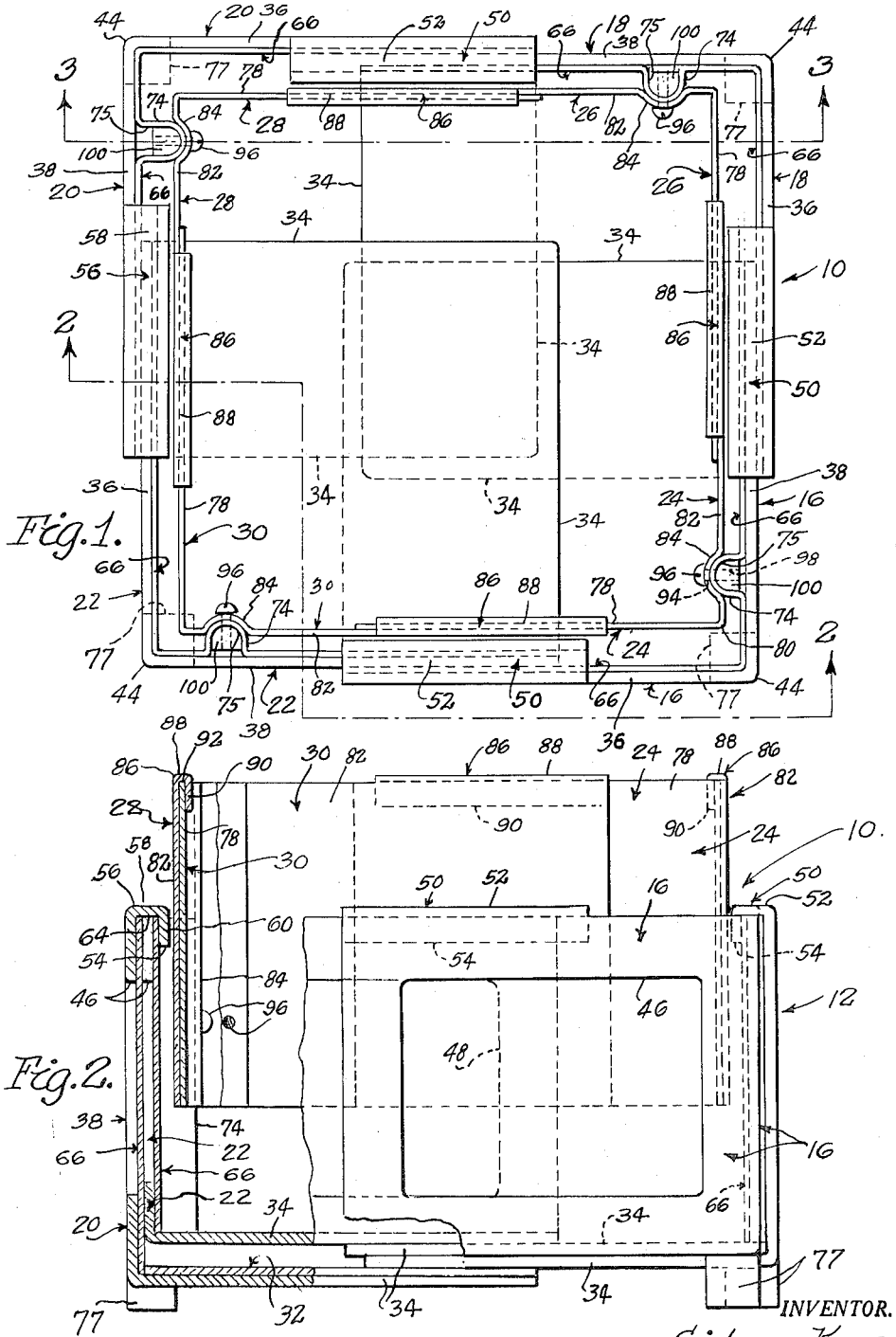

United States Patent Office 2,732,091
Patented Jan. 24, 1956

2,732,091

ADJUSTABLE FLOWER BOX

Sidney Kass, New York, N. Y.

Application November 12, 1954, Serial No. 468,384

6 Claims. (Cl. 220—8)

This invention relates to flower boxes used for holding flowers or other plants and in particular to adjustable flower boxes.

One object of this invention is to provide an adjustable flower box wherein the side of the flower box can be varied in either two or all three of its dimensions, namely, in its length, breadth or height or in any two or all three of these dimensions.

Another object is to provide an adjustable flower box wherein the flower box is made up of a lower assembly of relatively slidable quarter units composed of portions of the sides and, for the most part, of the bottom of the flower box, these portions slidably engaging one another so that the quarter units may be made to approach or recede from one another to contact or enlarge the space within the box.

Another object is to provide an adjustable flower box as set forth in the object immediately preceding, wherein the flower box is additionally provided with a vertically-sliding upper set of bottomless quarter units which also slide horizontally relatively to one another and which are slidably attached to the lower assembly so as to enable increasing the height of the box as well as its lateral dimensions.

Other objects and advantages of the invention will become apparent during the course of the following description of the accompanying drawings, wherein:

Figure 1 is a top plan view of an adjustable flower box according to one form of the invention, with the proportions of the various components of the box drawn upon an exaggerated scale to more clearly bring out the adjustment construction;

Figure 2 is a vertical section taken along the zigzag line 2—2 in Figure 1, so as to present the view partly in central vertical section and partly in side elevation.

Figure 3 is a vertical section taken along the line 3—3 in Figure 1, showing the relatively sliding connections between the lower and upper assemblies of the flower box;

Figure 4 is a perspective view of one of the quarter units of the lower assembly of the flower box of Figures 1 to 3 inclusive; and Figure 5 is a cross-section through a closure sheet of flexible material used to close a gap in the bottom of the lower assembly when the quarter units thereof are spread apart from one another to enlarge the box.

Referring to the drawings in detail, Figures 1 to 3 inclusive show an adjustable flower box, generally designated 10, according to one form of the invention, consisting generally of relatively movable lower and upper assemblies, generally designated 12 and 14 respectively, each of which is composed of a plurality of quarter or corner units which are adjustable two-dimensionally in horizontal directions relatively to one another so as to provide either a two-dimensionally or a three-dimensionally adjustable flower box. The lower assembly 12 consists of four partly telescoping or relatively sliding bottomed quarter or corner units, generally designated 16, 18, 20 and 22 respectively, whereas the upper assembly 14 also consists of four relatively sliding but bottomless quarter or corner units, generally designated 24, 26, 28 and 30 respectively. In addition, the lower assembly 12 is provided with a flexible plate-shaped bottom closure member, generally designated 32, adapted to seal the engagement of the bottoms of the lower quarter units 16, 18, 20 and 22 and prevent leakage of the contents. As previously stated, the relative thicknesses of the walls and spacing of the walls is greatly exaggerated and the size of the box greatly diminished in order to clearly bring out the construction of parts which might otherwise to be on too small a scale to be clearly and easily seen, because of the thinness of the sheet material and the closely sliding engagement thereof in the box as it would be actually constructed.

The lower quarter or corner units 16, 18, 20 and 22, so called because each comprises approximately one-quarter of the whole assembly 12 at the corners thereof, are of generally similar construction, as illustrated by the perspective view of the lower quarter unit 18 in Figure 4, except that the lower unit 20 has an additional hook portion in the form of an overhanging flange, as described below, so that a single description will suffice for these lower units, with particular reference to Figure 4. Each of the lower units 16, 18, 20 and 22 has a bottom-wall 34 and two mutually perpendicular slide walls 36 and 38 joined to one another along corner edges 40, 42 and 44, the slide walls 36 and 38 being optionally provided with cut out openings 46 and 48 respectively. The bottom and side walls 34, 36 and 38 are preferably cut or stamped from a single sheet of suitable material, such as sheet metal, and the two free edges united to one another by soldering, welding or the like. For purposes of simplicity, the unit 18 is shown with the walls 34, 36 and 38 integral with one another without showing the soldered or welded junction edges.

In the lower units 16, 18, 20 and 22, the side wall 36 has an inwardly-projecting overhanging flange or hook portion 50 formed integral therewith and of inverted L-shaped cross-section with a horizontal or flat upper portion 52 and a vertical downwardly-extending edge portion 54. In addition, the lower unit 20 (Figures 1 and 2) has a second inwardly-projecting overhanging flange 56 of similar construction and similarly having a horizontal upper portion 58 and an inner downwardly-projecting edge portion 60. The inverted L-shaped flanges 50 and 56 are so formed as to provide inverted trough-like spaces 62 and 64 respectively (Figures 4 and 2) into which the other side walls 38 can be slid, as explained below in connection with the operation.

In addition to the bottom and side walls 34, 36 and 38, each of the lower quarter or corner units 16, 18, 20 and 22 is provided with a liner, generally designated 66 (Figure 4) composed of sheet material, such as sheet metal, sheet plastic or the like, and consisting of two substantially flat portions 68 and 70 integral with one another and joined along a common corner edge 72, so that the liner is approximately L-shaped. The liner portion 70, in addition, is provided with an inwardly-projecting hollow rib portion 74 of approximately U-shaped cross-section with a U-shaped trough 75 therein and with an elongated vertical slot 76 extending up and down the major portion of the height of the rib 74. This rib 74 provides for an adjustable sliding connection between the lower and upper assemblies 12 and 14, as explained in more detail below. The liner 66 is attached to the inside of the walls 36 and 38 of the units 16, 18, 20 and 22 in any suitable manner, such as by rivets or other fasteners (not shown). Each of the lower quarter units 16, 18, 20 and 22 has a supporting leg or foot 77 suitably attached thereto.

The upper assembly 14 consists of the four L-shaped bottomless quarter or corner units 24, 26, 28 and 30 of similar construction one to the other, hence a single description will suffice, choosing, for example, the upper unit 24. The unit 24 has a plain wall 78 joined along a corner edge 80 and integral with a ridged wall 82, both being stamped out of a single sheet of sheet material, such as sheet metal, sheet plastic or the like. The ridged wall 82 is provided with a hollow ridge 84 of similar internal configuration to the rib 74, hence of approximately semi-cylindrical shape so as to mate with and slidably engage the rib 74 for upward or downward adjustment of the one relatively to the other. The ridged wall 82 also has an inwardly-overhanging flange or hook portion 86 also of inverted L-shaped form (Figure 2) with a horizontal top portion 88 and a downwardly-extending inner portion 90 integral therewith, thereby providing an elongated inverted trough-shaped space 92 for slidably receiving the plain wall portion 78 of one of the other upper units 26, 28 or 30.

In order to establish a locking yet releasable connection between the lower and upper assemblies 12 and 14, the hollow ridges 84 of the upper units 24, 26, 28 and 30 are drilled as at 94 to receive screws or other fasteners 96 which are threaded into the internally-threaded holes 98 (Figure 3) of semi-cylindrical nuts 100 which are shaped to snugly fit the U-shaped trough 75 within the hollow rib portions 74. The shank of the screw or other fastener 96 extends through the hole 94 and the elongated slot 76 into the threaded hole 98 of its respective nut 100 so as to clamp these parts together when the screw and nut 96 and 100 are tightened into clamping engagement with the correspondingly-shaped portions 75 and 84, but to permit vertical relative sliding engagement and guidance when the screws 96 are temporarily loosened in their respective nuts 100.

The flexible plate-shaped closure member 32 which seals the bottom of the lower assembly 12 consists of a composite sheet made up of a flexible sheet 102 of textile material, such as canvas or elastic deformable material, such as natural or synthetic rubber or a compound thereof, having pieces of fine mesh screening 104 and 106 secured to it, as by wire stitching or stapling, so as to present the laminated structure shown in Figure 5 which is stiffly flexible—that is, which can be bent into different shapes but will retain the shape to which it is bent. The use of this member 32 is described in connection with the operation of the invention below.

In the operation of the invention, the lower assembly 12 is first put together by sliding the fourth quarter unit 22 into the first quarter unit 16 which in turn is slidably received by the second quarter unit 18, after which all three of these quarter units 22, 16 and 18 slide together into the third quarter unit 20, which has the two flanges or overhanging hook portions 50 and 56 respectively for receiving the side walls 38 and 36 of the adjoining quarter units. The closure member 32 is inserted between the bottom wall 34 of the third quarter unit 20 and the bottom wall 34 of the second quarter unit 18, as shown in Figures 2 and 3.

Meanwhile, the upper assembly 14 has been put together in the manner shown in Figures 1 and 2, by sliding the plain wall 78 into the groove 92 of the hook portion or flange 86 of the ridged wall 82 of the adjacent quarter or corner unit, these upper quarter or corner units 24, 26, 28 and 30 being slid horizontally relatively to one another until they snugly fit the space inside the lower units 16, 18, 20 and 22 (Figure 1) and their hollow ridges 84 slidably engage and align themselves with the rib 74. The screws or other fasteners 96 are then inserted through their respective holes 94 and the elongated vertical slots 76 into the threaded holes 98 in their respective nuts 100. When the upper assembly 14 has been placed at the desired level relatively to the lower assembly 12, so as to give the desired depth to the box 10, the screws 96 are tightened so as to clamp these parts firmly together. The box 10 may then be filled with dirt and the plant or plants placed therein in the usual manner of placing such plants in flower boxes. It will also be obvious that the plants or flowers may be placed in conventional flower pots or vases which in turn are placed within the adjustable box 10.

What I claim is:

1. An adjustable flower box comprising a lower rectangular box-shaped structure composed of four relatively-slidable lower corner units each forming approximately one quarter thereof, each lower corner unit having two side walls connected perpendicularly to one another and a bottom wall connected perpendicularly to said side walls, the adjacent portions of said walls being disposed in overlapping horizontal sliding engagement, an upper rectangular side wall extension structure disposed in telescoping relationship with said lower structure and composed of four relatively slidable upper corner units, each upper corner unit forming approximately one quarter of said upper structure and having mutually perpendicular upper side walls with portions thereof disposed in overlapping sliding engagement with adjacent portions of other upper side walls, means interconnecting said lower and upper structures for holding said structures in their adjusted positions relatively to one another, and means on certain of said walls engageable with adjacent portions of other of said walls for holding said units in their adjusted positions.

2. An adjustable flower box comprising a lower rectangular box-shaped structure composed of four relatively-slidable lower corner units each forming approximately one quarter thereof, each lower corner unit having two side walls connected perpendicularly to one another and a bottom wall connected perpendicularly to said side walls, the adjacent portions of said walls being disposed in overlapping horizontal sliding engagement, an upper rectangular side wall extension structure disposed in telescoping relationship with said lower structure and composed of four relatively slidable upper corner units, each upper corner unit forming approximately one quarter of said upper structure and having mutually perpendicular upper side walls with portions thereof disposed in overlapping sliding engagement with adjacent portions of other upper side walls, means comprising fasteners interconnecting said lower and upper structures for holding said structures in their adjusted positions relatively to one another, and means on certain of said walls engageable with adjacent portions of other of said walls for holding said units in their adjusted positions.

3. An adjustable flower box comprising a lower rectangular box-shaped structure composed of four relatively-slidable lower corner units each forming approximately one quarter thereof, each lower corner unit having two side walls connected perpendicularly to one another and a bottom wall connected perpendicularly to said side walls, the adjacent portions of said walls being disposed in overlapping horizontal sliding engagement, an upper rectangular side wall extension structure disposed in telescoping relationship with said lower structure and composed of four relatively slidable upper corner units, each upper corner unit forming approximately one quarter of said upper structure and having mutually perpendicular upper side walls with portions thereof disposed in overlapping sliding engagement with adjacent portions of other upper side walls, means comprising relatively-slidable vertically-disposed guideways on certain of said walls of said upper and lower structures and fasteners interconnecting said guideways for holding said structures in their adjusted positions relatively to one another, and means on certain of said walls engageable with adjacent portions of other of said walls for holding said units in their adjusted positions.

4. An adjustable flower box comprising a lower rectangular box-shaped structure composed of four relatively-slidable lower corner units each forming approximately one quarter thereof, each lower corner unit having two side walls connected perpendicularly to one another and a bottom wall connected perpendicularly to said side walls, the adjacent portions of said walls being disposed in overlapping horizontal sliding engagement, an upper rectangular side wall extension structure disposed in telescoping relationship with said lower structure and composed of four relatively slidable upper corner units, each upper corner unit forming approximately one quarter of said upper structure and having mutually perpendicular upper side walls with portions thereof disposed in overlapping sliding engagement with adjacent portions of other upper side walls, means interconnecting said lower and upper structures for holding said structures in their adjusted positions relatively to one another, means on certain of said walls engageable with adjacent portions of other of said walls for holding said units in their adjusted positions, and a sealing member of yielding sheet material interposed between overlapping portions of certain of said bottom walls.

5. An adjustable flower box comprising a lower rectangular box-shaped structure composed of four relatively-slidable lower corner units each forming approximately one quarter thereof, each lower corner unit having two side walls connected perpendicularly to one another and a bottom wall connected perpendicularly to said side walls, the adjacent portions of said walls being disposed in overlapping horizontal sliding engagement, an upper rectangular side wall extension structure disposed in telescoping relationship with said lower structure and composed of four relatively slidable upper corner units, each upper corner unit forming approximately one quarter of said upper structure and having mutually perpendicular upper side walls with portions thereof disposed in overlapping sliding engagement with adjacent portions of other upper side walls, means interconnecting said lower and upper structures for holding said structures in their adjusted positions relatively to one another, and means on certain of said walls engageable with adjacent portions of other of said walls in overhanging relationship therewith for holding said units in their adjusted positions.

6. An adjustable flower box comprising a lower rectangular box-shaped structure composed of four relatively-slidable lower corner units each forming approximately one quarter thereof, each lower corner unit having two side walls connected perpendicularly to one another and a bottom wall connected perpendicularly to said side walls, the adjacent portions of said walls being disposed in overlapping horizontal sliding engagement, an upper rectangular side wall extension structure disposed in telescoping relationship with said lower structure and composed of four relatively slidable upper corner units, each upper corner unit forming approximately one quarter of said upper structure and having mutually perpendicular upper side walls with portions thereof disposed in overlapping sliding engagement with adjacent portions of other upper side walls, means interconnecting said lower and upper structures for holding said structures in their adjusted positions relatively to one another, and means comprising hook portions on certain of said walls engageable with adjacent portions of other of said walls for holding said units in their adjusted positions.

References Cited in the file of this patent

UNITED STATES PATENTS

| | | |
|---|---|---|
| 1,212,948 | Hesse | Jan. 16, 1917 |
| 1,746,720 | Sullivan et al. | Feb. 11, 1930 |
| 1,941,375 | Wildman | Dec. 26, 1933 |

FOREIGN PATENTS

| | | |
|---|---|---|
| 128,918 | Australia | Aug. 27, 1948 |